United States Patent
Kim et al.

(10) Patent No.: US 9,491,782 B2
(45) Date of Patent: Nov. 8, 2016

(54) METHOD AND APPARATUS FOR MANAGING MULTIPLE TIMING ADVANCE GROUPS IN MOBILE COMMUNICATION SYSTEM SUPPORTING CARRIER AGGREGATION

(75) Inventors: Sangbum Kim, Seoul (KR); Kyeongin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 13/440,351

(22) Filed: Apr. 5, 2012

(65) Prior Publication Data

US 2012/0257601 A1    Oct. 11, 2012

Related U.S. Application Data

(60) Provisional application No. 61/471,872, filed on Apr. 5, 2011.

(30) Foreign Application Priority Data

Apr. 5, 2012 (KR) .................. 10-2012-0035238

(51) Int. Cl.
    *H04W 72/04* (2009.01)
    *H04J 3/00* (2006.01)
    (Continued)

(52) U.S. Cl.
    CPC .......... *H04W 74/0891* (2013.01); *H04L 5/001* (2013.01); *H04W 56/0045* (2013.01); *H04W 74/006* (2013.01); *H04W 74/085* (2013.01); *H04W 48/08* (2013.01); *H04W 72/00* (2013.01); *H04W 72/04* (2013.01); *H04W 74/0833* (2013.01)

(58) Field of Classification Search
    None
    See application file for complete search history.

(56) References Cited

U.S. PATENT DOCUMENTS

| 8,934,459 | B2 * | 1/2015 | Marinier | ................ H04L 5/001 370/336 |
| 2009/0201868 | A1 * | 8/2009 | Chun | ................ H04W 72/1278 370/329 |

(Continued)

OTHER PUBLICATIONS

ZTE, Discussion on Multiple TA, 3GPP Draft, R2-111908, 3rd Generation Partnership Project, Moblie Competence 5 Centre, 650, Route Des Lucioles, F-06921 Sophia-Antipolis Cedex, France, vol. RAN WG2 #73bis, Shanghai, China, Apr. 11-15, 2011 (Retrieved Apr. 4, 2011 by EPO).*

(Continued)

*Primary Examiner* — Steve Young
(74) *Attorney, Agent, or Firm* — Jefferson IP Law, LLP

(57) ABSTRACT

A method and apparatus for managing multiple Timing Advance Groups (TAGs) operating with different timings are provided for use in a Long Term Evolution (LTE) system. The method for managing multiple TAGs at a base station of a wireless communication system supporting carrier aggregation according to an exemplary embodiment of the present invention includes categorizing a plurality of carriers into at least one TAG according to a predetermined rule, assigning a TAG index to each TAG, transmitting the TAG index to a terminal, generating a Timing Advance Command (TAC) for synchronization, and transmitting the TAC to the terminal in a random access process. The method and apparatus for managing TAGs according to exemplary embodiments of the present invention is capable of informing of the timing advance group to which each carrierbelongs and managing multiple timing advance groups efficiently without signaling overhead.

20 Claims, 11 Drawing Sheets

(51) Int. Cl.
| | |
|---|---|
| *H04W 74/08* | (2009.01) |
| *H04W 74/00* | (2009.01) |
| *H04L 5/00* | (2006.01) |
| *H04W 56/00* | (2009.01) |
| *H04W 48/08* | (2009.01) |
| *H04W 72/00* | (2009.01) |

(56) References Cited

U.S. PATENT DOCUMENTS

| | | | |
|---|---|---|---|
| 2011/0194441 | A1 | 8/2011 | Jung et al. |
| 2011/0200032 | A1* | 8/2011 | Lindstrom et al. ............ 370/350 |
| 2011/0243102 | A1* | 10/2011 | Sebire et al. ................. 370/336 |
| 2012/0008600 | A1* | 1/2012 | Marinier et al. ............. 370/336 |
| 2012/0093098 | A1* | 4/2012 | Charbit et al. ................ 370/329 |
| 2012/0250520 | A1* | 10/2012 | Chen et al. ................... 370/241 |
| 2012/0287865 | A1* | 11/2012 | Wu .................... H04W 74/006 370/329 |
| 2013/0010619 | A1* | 1/2013 | Fong et al. ................... 370/252 |
| 2013/0058315 | A1* | 3/2013 | Feuersanger et al. ........ 370/336 |
| 2013/0114576 | A1* | 5/2013 | Kwon .................... H04L 5/001 370/336 |
| 2013/0258958 | A1* | 10/2013 | Dinan ............... H04W 56/0045 370/329 |
| 2014/0228013 | A1* | 8/2014 | Yang .................. H04W 56/009 455/418 |
| 2014/0293915 | A1* | 10/2014 | Pelletier ............. H04W 74/002 370/329 |

OTHER PUBLICATIONS

NTT Docomo, Inc., 'CA support for multi-TA.', 3GPP TSG-RAN2#69, R2-101567, Feb. 22-26, 2010.

QUALCOMM Incorporated, 'Supporting multiple timing advance groups.', 3GPP TSG-RAN WG2 meeting#68bis, R2-100423, Jan. 18-22, 2010.

Nokia Corporation et al., 'RACH and carrier aggregation.', 3GPP TSG-RAN WG2 Meeting #68bis, R2-100372, Jan. 18-22, 2010.

ZTE, Impact analysis of multiple TA, 3GPP Draft, R2-100308, 3rd Generation Partnership Project, Mobile Competence Centre, 650, Route Des Lucioles, F-06921 Sophia-Antipolis Cedex, France, vol. RAN WG2 #68bis, Valencia, Spain, Jan. 18-22, 2010.

ZTE, Discussion on Multiple TA, 3GPP Draft, R2-111908, 3rd Generation Partnership Project, Mobile Competence Centre, 650, Route Des Lucioles, F-06921 Sophia-Antipolis Cedex, France, vol. RAN WG2 #73bis, Shanghai, China, Apr. 11-15, 2011.

Samsung, Main Issues in supporting multi-TAs, 3GPP Draft, R2-112305, Moblie Competence Centre, 650, Route Des Lucioles, F-06921 Sophia-Antipolis Cedex, France, vol. Ran WG2 #73bis, Shanghai, China, Apr. 11-15, 2011.

LG Electronics Inc.,TAG ID configuration for SCell in pTAG [online], 3GPP TSG-RAN WG2#77bis R2-121369, Internet <URL:http://www.3gpp.org/ftp/tsg_ran/WG2_RL2/TSGR2_77bis/Docs/R2-121369.zip>, Mar. 26, 2012.

Sharp, Remaining issues of TA group handling [online], 3GPP TSG-RAN WG2#77bis R2-121384, Internet <URL:http://www.3gpp.org/ftp/tsg_ran/WG2_RL2/TSGR2_77bis/Docs/R2-121384.zip>, Mar. 26, 2012.

Sharp, TA group handling [online], 3GPP TSG-RAN WG2#77 R2-120218, Internet <URL:http://www.3gpp.org./ftp/tsg_ran/WG2_RL2/TSGR2_77/Docs/R2-120218.zip>, Mar. 26, 2012.

InterDigital Communications, Renesas Mobile Europe, Huawei, HiSilicon, LG Electronics Inc., MSG2 Reception for SCells (Alternative B3) [online], 3GPP TSG-RAN WG2#77bis R2-121868, Internet <URL:http://www.3gpp.org/ftp/tsg_ran/WG2_RL2/TSGR2_77bis/Docs/R2-121868.zip>, Mar. 26, 2012.

* cited by examiner

FIG. 4
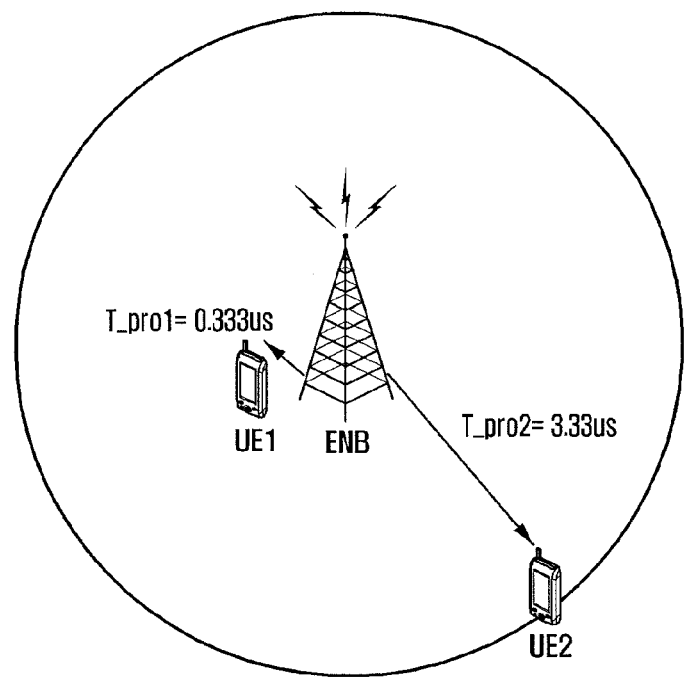
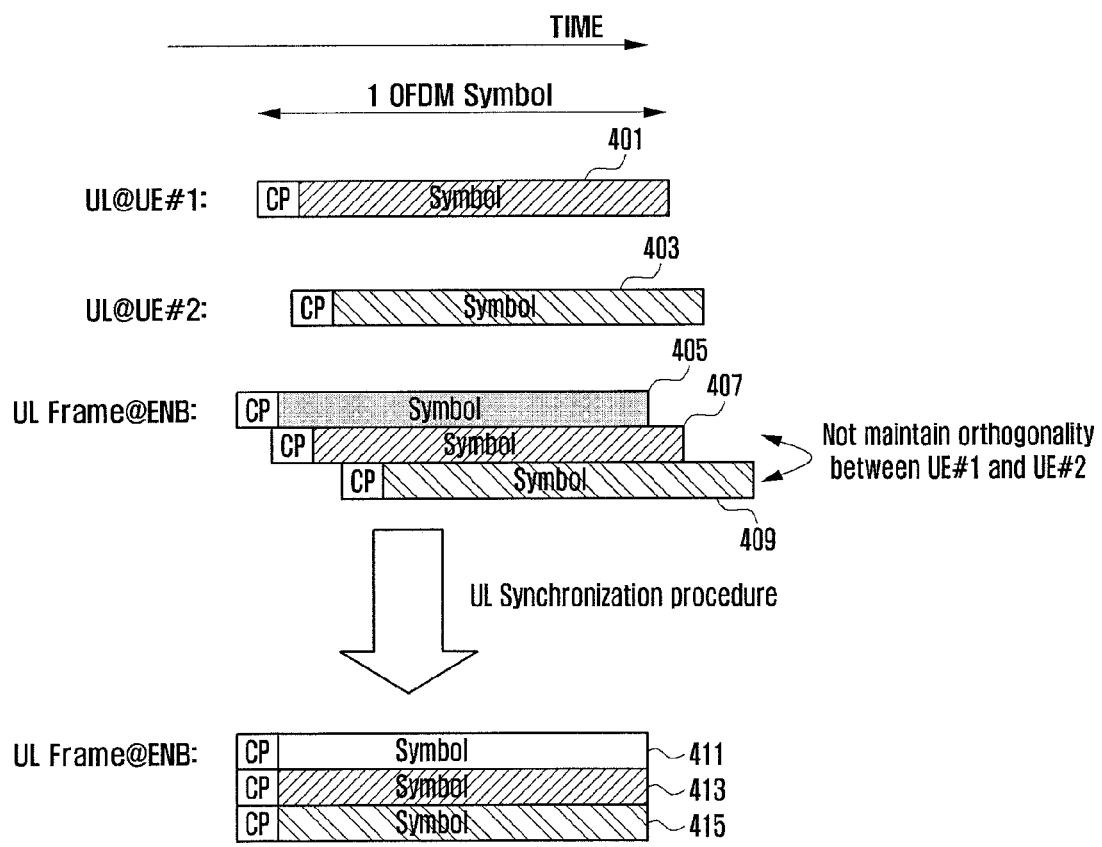

METHOD AND APPARATUS FOR MANAGING MULTIPLE TIMING ADVANCE GROUPS IN MOBILE COMMUNICATION SYSTEM SUPPORTING CARRIER AGGREGATION

PRIORITY

This application claims the benefit under 35 U.S.C. §119(e) of a U.S. Provisional application filed on Apr. 5, 2011 in the U.S. Patent and Trademark Office and assigned Ser. No. 61/471,872, and under 35 U.S.C. §119(a) of a Korean patent application filed on Apr. 5, 2012 in the Korean Intellectual Property Office and assigned Serial No. 10-2012-0035238, the entire disclosure of each of which is hereby incorporated by reference.

BACKGROUND OF THE INVENTION

1. Field of the Invention

The present invention relates to radio communications. More particularly, the present invention relates to a method and apparatus for managing multiple timing advance groups operating with different timings in a Long Term Evolution (LTE) system.

2. Description of the Related Art

With the rapid advance of radio communication technology, the communication system has highly evolved. Long Term Evolution (LTE) is one of the promising $4^{th}$ generation mobile communication technologies. In an LTE system, various techniques are adopted to meet the explosively increasing traffic demands, and carrier aggregation is one of such techniques. In contrast to legacy LTE systems using a single carrier, between a User Equipment (UE) and an evolved Node B (eNB), LTE systems may use carrier aggregation to flexibly expand available bandwidth by aggregating multiple secondary carriers with a primary carrier. In LTE, the primary carrier is referred to as Primary Cell (PCell) and the secondary carrier as Secondary Cell (SCell).

Meanwhile, for cases in which the locations of the eNB apparatuses using the primary and secondary carriers are different from each other due to the deployment of repeaters and Remote Radio Head, it may be necessary to change the uplink transmission timing. For example, when the eNB apparatus configured with the primary carrier and another eNB apparatus configured with the secondary carrier are located at different places, it may cause problem in transmission timing depending on the location of the UE because the uplink signal addressed to the remote eNB apparatus should be transmitted earlier than the signal addressed to the near eNB apparatus. In such cases, there may exist multiple uplink timings, and it is advantageous for management and reduction of control signaling overhead, to categorize the carriers having the same uplink timing into a group. Such a group is referred to as Timing Advance Group (TAG). Because uplink timing is configured on a per TAG basis, there is a need of a method for managing multiple uplink timings efficiently.

Therefore a need exists for a method and apparatus for managing multiple timing advance groups operating with different timings in a Long Term Evolution (LTE) system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for managing multiple timing advance groups that is capable of selecting an uplink MCS table index in adaptation to a number of users and uplink resource utilization amount.

In accordance with an aspect of the present invention, a method for managing multiple Timing Advance Groups (TAGs) at a base station of a wireless communication system supporting carrier aggregation is provided. The method includes categorizing a plurality of carriers into at least one TAG according to a predetermined rule, assigning a TAG index to each TAG, transmitting the TAG index to a terminal, generating a Timing Advance Command (TAC) for synchronization, and transmitting the TAC to the terminal in a random access process.

In accordance with another aspect of the present invention, a method for managing multiple TAGs at a terminal of a wireless communication system supporting a carrier aggregation technique is provided. The method includes receiving a TAG index per TAG according to a predetermined rule, applying the received TAG indices, receiving timing advance command from a base station in random access process, and acquiring synchronization according to the received timing advance command.

In accordance with another aspect of the present invention, a base station managing multiple TAGs in a wireless communication system supporting a carrier aggregation technique is provided. The base station includes a transceiver which transmits and receives data, and a controller which controlling categorizing a plurality of carriers into at least one TAG according to a predetermined rule, assigning a TAG index to each TAG, transmitting the TAG index to a terminal, generating a Timing Advance Command (TAC) for synchronization, and transmitting the TAC to the UE in a random access process.

In accordance with still another aspect of the present invention, a terminal for managing multiple TAGs in a wireless communication system supporting a carrier aggregation technique is provided. The terminal includes a transceiver which transmits and receives data, and a controller which controls receiving a TAG index per TAG according to a predetermined rule, applying the received TAG indices, receiving timing advance command from a base station in random access process, and acquiring synchronization according to the received timing advance command.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 is a diagram illustrating a principle of uplink timing synchronization in an Orthogonal Frequency Division Multiplexing (OFDM) based 3rd Generation Partnership Project (3GPP) LTE system according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
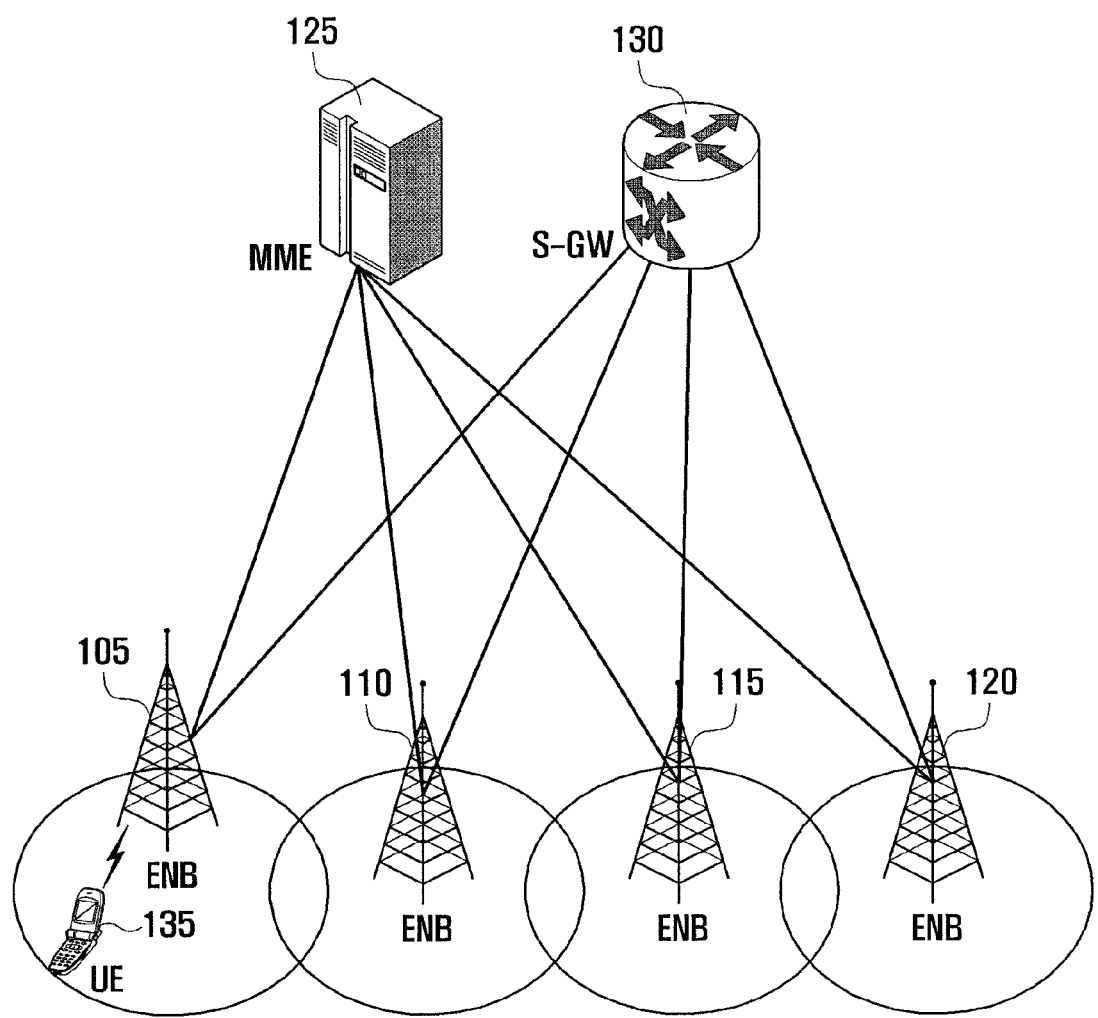
FIG. 1 is a diagram illustrating an architecture of a Long Term Evolution (LTE) system according to an exemplary embodiment of the present invention.

FIG. 1 is a diagram illustrating an architecture of a Long Term Evolution (LTE) system according to an exemplary embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (UE) 135 connects to an external network via eNBs 105, 110, 115, and 120 and the S-GW 130.

In FIG. 1, the eNBs 105, 110, 115, and 120 correspond to legacy node Bs of a Universal Mobile Communications System (UMTS). The eNBs 105, 110, 115, and 120 allow the UE to establish a radio link and are responsible for complicated functions as compared to a legacy node B. In an LTE system, all the user traffic including real time services such as Voice over Internet Protocol (VoIP) are provided through a shared channel. Thus, there is a need for an eNB which includes a unit for scheduling data based on state information such as UE buffer conditions, power headroom state, and channel state. Typically, one eNB controls a plurality of cells. In order to secure a data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and is connected to a plurality of eNBs 105, 110, 115, and 120.

Figure 2:
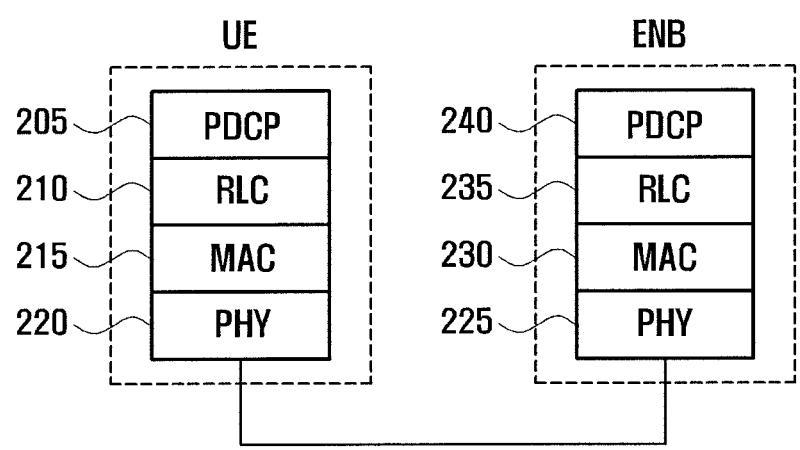
FIG. 2 is a diagram illustrating a protocol stack of an LTE system according to an exemplary embodiment of the present invention.

FIG. 2 is a diagram illustrating a protocol stack of an LTE system according to an exemplary embodiment of the present invention.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments of appropriate size for Automatic Repeat Request (ARQ) operation. ARQ is a technique for determining whether the packet transmitted by the transmitter is received by the receiver successfully and for retransmitting the packets which were received erroneously. The MAC 215 and 230 is responsible for establishing connection to a plurality of RLC entities so as to multiplex RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. Also, the PHY layer uses Hybrid ARQ (HARQ) for additional error correction by transmitting 1 bit information indicating for positive or negative acknowledgement from the receiver to the transmitter. The 1 bit corresponding to a positive acknowledgement a negative acknowledgement indicator is referred to as HARQ ACK/NACK information. The downlink HARQ ACK/NACK corresponding to uplink transmission is transmitted through a Physical Hybrid-ARQ Indicator Channel (PHICH), and the uplink HARQ ACK/NACK is transmitted through a Physical Uplink Control Channel (PUCCH) or Physical Uplink Shared Channel (PUSCH).

Figure 3:
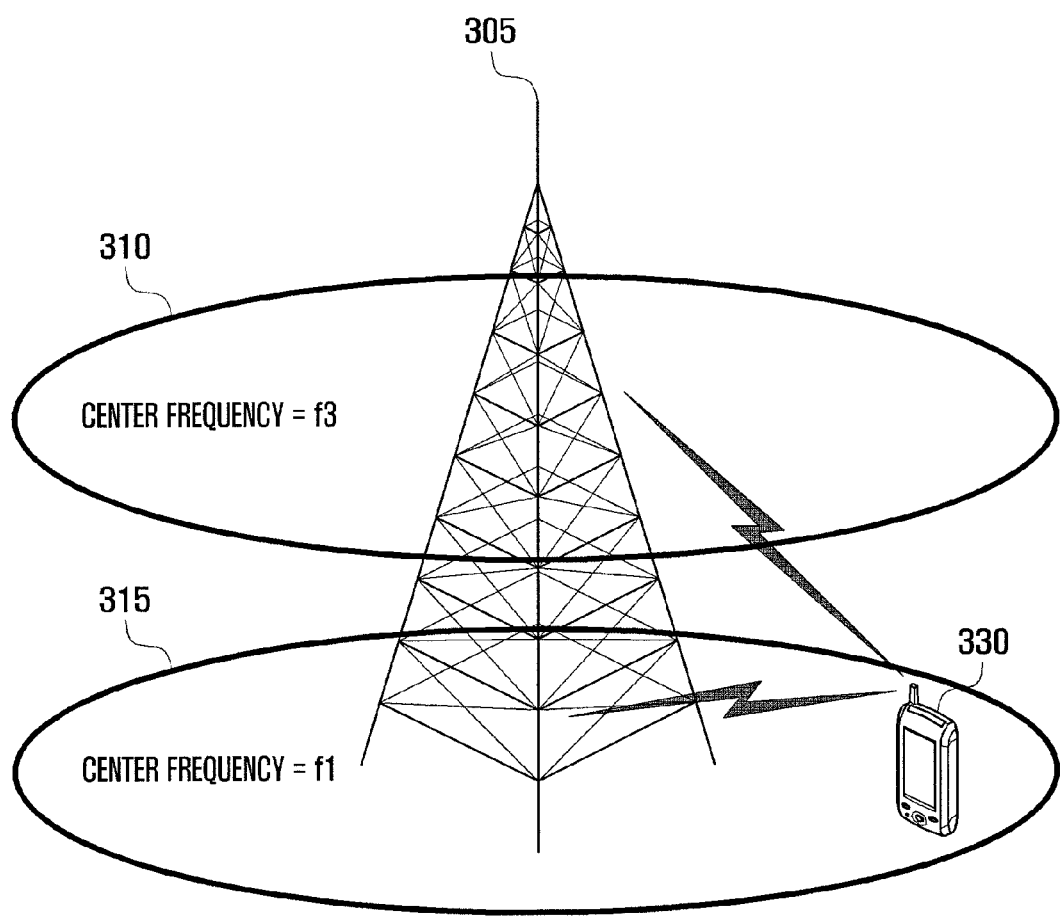
FIG. 3 is a diagram illustrating an exemplary situation of carrier aggregation in an LTE system according to an exemplary embodiment of the present invention.

FIG. 3 is a diagram illustrating an exemplary situation of carrier aggregation in an LTE system according to an exemplary embodiment of the present invention.

Referring to FIG. 3, typically an eNB can use multiple carriers transmitted and receive in different frequency bands. For example, the eNB 305 can be configured to use the carrier 315 with center frequency f1 and the carrier 310 with center frequency f3. If carrier aggregation is not supported, the UE 330 has to transmit/receive data using one of the carriers 310 and 315. However, if carrier aggregation is supported, then the UE 330 having the carrier aggregation capability can transmit/receive data using both the carriers 310 and 315. The eNB 305 can increase the amount of the resource to be allocated to the UE having the carrier aggregation capability in adaptation to the channel condition of the UE so as to improve the data rate of the UE.

By taking notice that a cell is configured with one downlink carrier and one uplink carrier in a conventional communication system, the carrier aggregation can be understood as if the UE communicates data via multiple cells. With the use of carrier aggregation, the maximum data rate increases in proportion to the number of aggregated carriers.

In the following description, the phrase "the UE receives data through a certain downlink carrier or transmits data through a certain uplink carrier" corresponds to transmission or reception data through control and data channels provided in a cell corresponding to center frequencies and frequency bands of the downlink and uplink carriers. Although the description is directed to an LTE mobile communication system for explanation convenience, exemplary embodiments of the present invention can be applied to other types of wireless communication systems supporting carrier aggregation.

FIG. 4 is a diagram illustrating a principle of uplink timing synchronization in an Orthogonal Frequency Division Multiplexing (OFDM) based 3rd Generation Partnership Project (3GPP) LTE system according to an exemplary embodiment of the present invention.

Referring to FIG. 4, the UE#1 is located in close proximity to the eNB while the UE#2 is located at a relatively further proximity from the eNB. T_pro1 indicates the first propagation delay time to the UE#1, and T_pro2 indicates the second propagation delay to the UE#2. As shown in FIG. 4, the UE#1 is located near the eNB as compared to the UE#2 and thus the UE#1 has a relatively short propagation delay (e.g., T_pro1 is 0.333 us, T_pro2 is 3.33 us).

When the UE#1 and UE#2 power on or operate in idle mode within a cell of the eNB, the uplink timing of the UE#1, the uplink timing of the UE#2, and the uplink timings of other UEs detected by the eNB in the cell may fail in synchronization (e.g., the uplink timings of the various UEs in the cell may fail to be synchronized with each other).

Reference number 401 denotes uplink OFDM symbol transmission timing of the UE#1, and reference number 403 denotes uplink OFDM symbol transmission timing of the UE#2. By taking notice of the uplink transmission propagation delays of the UE#1 and UE#2, the eNB may receive the uplink OFDM symbols at the timings as denoted by reference numbers 405, 407, and 409. The UE#1's uplink symbol transmitted at the timing 401 is received by the eNB at the timing 407 with propagation delay while the UE#2's uplink symbol transmitted at the timing 403 is received by the eNB at the timing 409 with propagation delay.

In FIG. 4, because the timings 407 and 409 correspond to timings before synchronization between the uplink transmission timings of the UE#1 and UE#2, the uplink OFDM symbol reception and decoding start timing 405 of the eNB, the UE#1's uplink OFDM symbol reception timing 407, and the UE#2's uplink OFDM symbol reception timing 409 are different among each other. In other words, the timings 405, 407, and 409 appear offset because the timings are not synchronized with each other.

In this case, the uplink symbols transmitted by the UE#1 and UE#2 have no orthogonality so as to interfere with each other and, as a consequence, the eNB is likely to fail decoding the uplink symbols transmitted, at the timing 401 and 403, by the UE#1 and UE#2 due to the interference and the mismatch between the uplink symbol reception timings 407 and 409.

Uplink timing synchronization is a procedure for acquiring the eNB's uplink symbol reception timings with the UE#1 and UE#2 and, if the uplink timing synchronization procedure is completed, it is possible to acquire the synchronization among the eNB's uplink OFDM symbol reception and decoding start timing, UE#1's uplink OFDM symbol reception timing, and UE#2's uplink OFDM symbol reception timing as denoted by reference numbers 411, 413, and 415. In the uplink timing synchronization procedure, the eNB transmits Timing Advance (TA) information to the UEs to notify the UEs of the timing adjustment amount. For example, the eNB may transmit the TA information in the Timing Advance Command MAC Control Element (TAC MAC CE) or in the Random Access Response (RAR) message in response to the random access preamble transmitted by the UE for initial access.

If the TA information is received, the UE starts a time alignment timer (timeAlignmentTimer or TAT). The TAT is the timer for verifying the validity of the TA. That is, the TA is valid before the expiry of the TAT, however, the validity of the TA is not guaranteed after the expiry of the TAT. If additional TA information is received afterward, the TAT restarts and, if the TAT expires, TA information received from the eNB after the expiry of the TAT is regarded as invalid so as to set the uplink communication with the eNB. By acquiring synchronization among the transmission timings as described above, it is possible to maintain the orthogonality between the uplink symbols of the UE#1 and UE#2 such that the eNB can decode the uplink symbols from the UE#1 and UE#2 at the timings 401 and 403 successfully.

Figure 5:
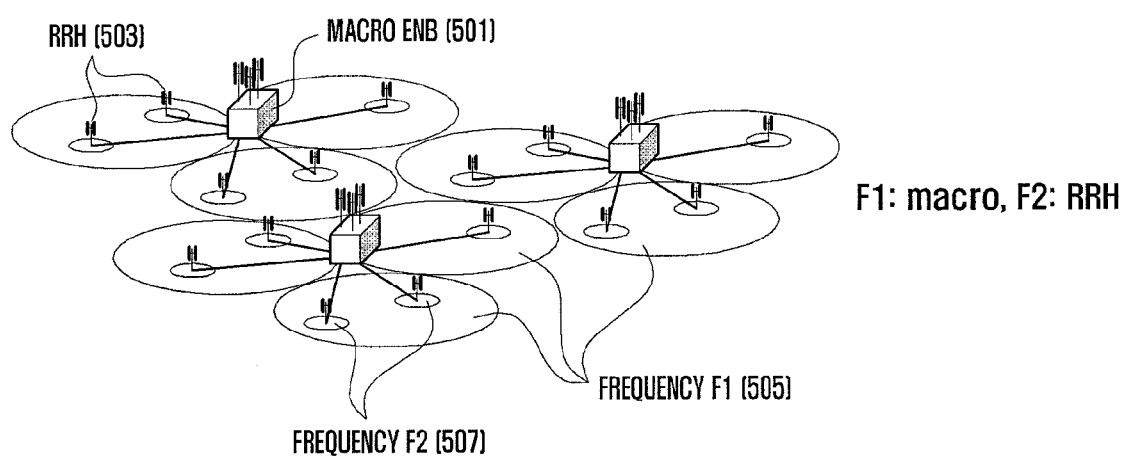
FIG. 5 is a diagram illustrating an exemplary network environment having network entities operating on primary and secondary carriers at different locations in a system according to an exemplary embodiment of the present invention supporting carrier aggregation.

FIG. 5 is a diagram illustrating an exemplary network environment having network entities operating on primary and secondary carriers at different locations in a system according to an exemplary embodiment of the present invention supporting carrier aggregation.

Referring to FIG. 5, the Remote Radio Heads (RRHs) 503 operating on frequency band F2 507 are deployed around the macro eNB 501 using frequency band F1 505. If the UE is connected to both the macro eNB and the RRH and is located near the RRH and if the UE transmits signal via the RRH, the signal can reach the RRH at an appropriate timing even when there is a little delay due to the short distance. However, the signal transmitted to the macro eNB fails to reach the macro eNB at an appropriate timing due to the long distance. In order to overcome this problem, the UE may operate with aggregated carriers to synchronize multiple uplink transmission timings.

For this purpose, exemplary embodiments of the present invention propose a method in which the eNB categorizes the carriers having similar uplink timings into a group. This group is referred to as Timing Advance Group (TAG). Further, there is a need for a method for managing the TAG groups efficiently.

Exemplary embodiments the present invention provide a method for informing the UE of a TAG to which each UE belongs and for controlling transmission of each TAG's TAC MAC CE to the UE efficiently for timing synchronization.

In an exemplary embodiment of the present invention in which one PCell (or first cell) and three SCells 1, 2 and 3 (or second cells) exist, if the PCell and the SCell 3 have different uplink timings and if the SCell 1 and SCell 2 have the uplink timings similar to each other but different than those of the PCell and SCell 3, then the PCell, the SCell 1 and SCell 2, and the SCell 3 can be categorized into TAG1, TAG2, and TAG3 respectively. In other words, the PCell may be categorized into TAG1, the SCell 1 and SCell 2 may be categorized into TAG2, and SCell 3 may be categorized into TAG 3. The PCell is the cell operating on the primary frequency through which the initial connection establishment and connection re-establishment procedures and handover procedure can be performed. The TAG including the PCell is referred to as PTAG and the TAG including only SCells is referred to as a TAG associated with a corresponding index (e.g., TAG1, TAG2, or the like.) That is, the eNB transmits the TA information in TAC MAC CE or RAR through TAG 2 for adjusting uplink timing, and the UE adjusts uplink timings for both the SCell 1 and SCell 2 according to the TAC MAC CE. Also, the uplink timings for the TAG1 and TAG3 are adjusted according to the information included in the TAC MAC CE for the corresponding TAG.

In order to adopt the concept of TAG, the eNB must inform the UE as to which carriers belong to the same TAG. The simplest approach for informing the UE of such information is to transmit the index of the TAG, to which the secondary carrier belong, in the SCell configuration provided to the UE. In case of the PCell, the highest TAG index value is allocated without explicit indication. That is, if the TAG index starts from 0, the TAG index of the PTAG including the primary carrier is 0. According to exemplary embodiments of the present invention, this method must add the TAG index to the configuration information of each secondary carrier, thereby resulting in increase of signaling overhead. According to other exemplary embodiments of the present invention, another approach is to provide the TAG index in the configuration information of only one secondary subcarrier among the subcarriers belonging to the same TAG. Although the actual TAG indices of other secondary carriers, the TAG to which the secondary cell belongs is indicated implicitly. The primary carrier (PCell) is allocated the highest TAG index without extra indication. That is, if the TAG index starts from 0, the TAG index of the PTAG to which the primary carrier belongs is 0. Although actual TAG indices are provided for the secondary carriers, it is possible to indicate the TAG to which each secondary carrier belongs implicitly. For instance, in the previous example, the SCell 1 and SCell 2 belong to the same TAG. However, the eNB provides the TAG index only in the configuration information of the SCell 1. If the configuration of the SCell 2 received from the eNB does not include a TAG index, then the TAG of the SCell 2 follows the TAG of the SCell 1 configured before the SCell. With this approach, it is possible to provide the information on the TAG to which each secondary carrier belongs without including the TAG index in the configurations of each respective secondary carrier.

The timing synchronization is performed using the TAC MAC CE on a per TAG basis. If the TAC MAC CE is transmitted per TAG, the number of TAC MAC CEs increases in proportional to the number of the TAG so as to be transmitted to the UE as distributed across MAC PDUs. The timing synchronization performed using the TAC MAC CE on a per TAG basis leaves room for improvement in terms of signaling optimization. If it is possible to transmit the TAC MAC CEs of multiple TAGs in fewer extended TAC MAC CEs, this can improve the resource efficiency. For example, the resource efficiency may be improved if the TAC MAC CEs of multiple TAGs are transmitted in one extended TAC MAC CE. Such an extended TAC MAC CE can be configured in various formats, and exemplary embodiments of the present invention propose several efficient formats of the extended TAC MAC CE.

First Exemplary Embodiment

Figure 6:
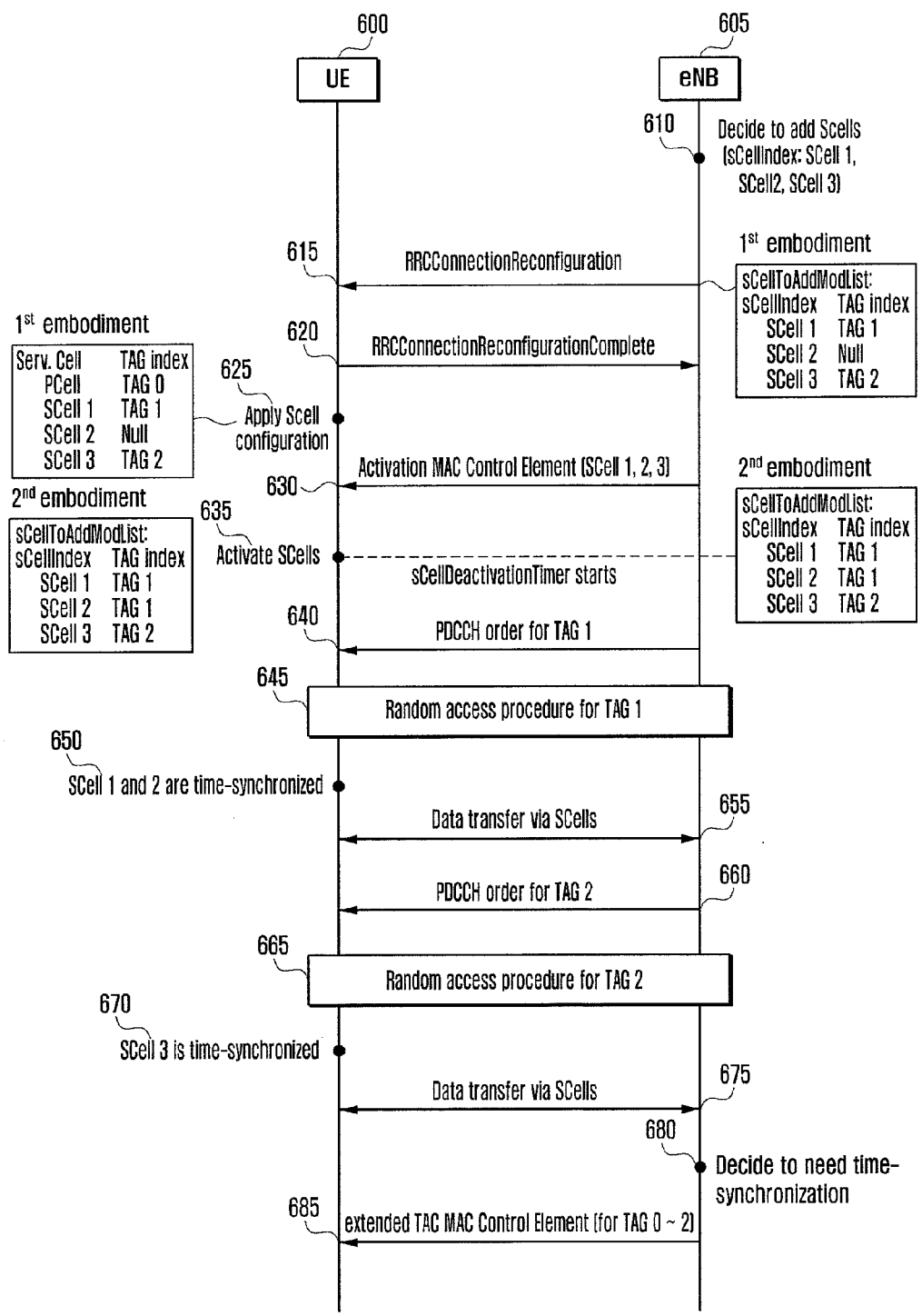
FIG. 6 is a signaling diagram illustrating a timing synchronization between a User Equipment (UE) and an evolved Node B (eNB) according to an exemplary embodiment of the present invention.

FIG. 6 is a signaling diagram illustrating a timing synchronization between an UE and an eNB according to an exemplary embodiment of the present invention.

Referring to FIG. 6, the eNB 605 decides to add three secondary cells (i.e. SCell 1, SCell 2, and SCell 3) to transmit data to the UE 600 at step 610. The SCell indices are set to 1, 2, and 3. The uplink timings of the SCell 1 and SCell 2 are identical with each other but differ from the uplink timing of the SCell 3. Also, the uplink timing of the PCell differs from all of the SCells. The eNB sets the TAG index of the PCell to 0. The SCell 1 and SCell 2 are configured with the TAG index 1, and the SCell 3 is configured with tag index 2. The eNB generates per-SCell configuration information. At this time, only the SCell 1 and SCell 3 are configured with respective TAG indices while the SCell 2 is not configured with any TAG index. The UE regards the TAG of the SCell 2 as being identical to the SCell 1. In order to follow this rule, it is necessary to assign the contiguous indices to the SCells having the same uplink timing. Among the contiguous indices, the TAG index is included with the configuration information on the SCell having the highest index among contiguous indices of the SCells.

The eNB 605 transmits to the UE 600 a RRC Connection Reconfiguration message including the configuration information of the respective SCells and the TAG index at step 615. Table 1 provides an example of the SCell configuration information included in the RRC Connection Reconfiguration message. For example, the eNB 605 provides the UE 600 with a SCell list to be added or released in the RRC Connection Reconfiguration message. The RRC Connection Reconfiguration message also includes the SCell configuration information per SCell to be added. As another example, the configuration information may also include the TAG index as described above.

TABLE 1

RRCConnectionReconfiguration-v1020-IEs ::= SEQUENCE {
    sCellToReleaseList-r10 ScellToReleaseList-r10 OPTIONAL, -- Need ON
    sCellToAddModList-r10 ScellToAddModList-r10 OPTIONAL, -- Need On
    nonCriticalExtension SEQUENCE { } OPTIONAL, -- Need OP The UE 600 transmits an RRC Connection Reconfiguration Complete message to the eNB 605 to notify the eNB 605 of the successful receipt of the RRC Connection Reconfiguration message at step 620.

The UE 600 applies to each SCell the corresponding SCell configuration information received from the eNB 605 at step 625. The configuration may include the SCell configuration information with TAG index or not. Because the TAG index is included in the configuration informations of the PCell and SCell 3 but not the SCell 2, the UE determines that the PCell and the SCell 3 belong to different TAGs and determines that the SCell 2 belongs to the same TAG as the SCell 1. Consequently, the SCell 1 and SCell 2 belong to the TAG which is different from the TAG to which the SCell 3 belongs. However, the UE regards the SCell 1 and SCell 2 as belonging to the same TAG.

The eNB 605 transmits SCell activation MAC CE to the UE 600 to activate the configured SCells at step 630. In an LTE radio communication system adopting the carrier aggregation technique, the data transmission does not occur with the configuration information simultaneously. For example, in order to start actual data transmission, it is necessary to first activate the configured SCells. The SCell activation is triggered by the MAC CE and, once the SCells are activated, the UE 600 starts operations necessary for PDCCH monitoring in the SCells, SRS transmission, and CQI/RMI/RI report for data transmission.

Upon receipt of the Activation MAC CE, the UE 600 activates the corresponding SCell at step 635. Upon the activation of the SCell, a sCellDeactivationTimer starts.

The eNB 605 performs timing synchronization for TAG 1 to transmit data. For this purpose, the UE transmits a PDCCH order to the UE 600 to trigger random access procedure at step 640. The PDCCH order includes the preamble to be used by the UE 600 and the random access resource information in order for the UE 600 to perform random access procedure without contention.

Upon receipt of the PDCCH order from the eNB 605, the UE 600 starts random access procedure at step 645. In the random access procedure, the eNB 605 provides the UE 600 with the Timing Advance Command (TAC) such that the UE 600 synchronizes the uplink timing based on the corresponding information.

The UE 600 acquires timing synchronization of the SCell 1 and SCell 2 belonging to TAG 1 through the random access procedure at step 650.

Next, the data transfer takes place via the SCell 1 and SCell 2 at step 655 with the uplink timing acquired at steps 645 and 650.

Afterward, the eNB 605 performs timing synchronization for TAG 2 to transmit data at step 660.

Upon receipt of the PDCCH order for TAG 2 at step 660, the UE 600 performs random access procedure to acquire time synchronization at step 665.

The UE 600 acquires time synchronization for the SCell 3 of the TAG 2 at step 670.

Once the time synchronization is acquired, the uplink data transfer may take place through the SCell 3 as well as the SCell 1 and the SCell 2 at step 675. At this time, the uplink data transfer follows the uplink timing acquired at steps 660 and 665.

Afterward, the eNB 680 detects the necessity of time synchronization again at step 680. As time progresses since the initial synchronization procedure, the time synchronization becomes unreliable. As an example, the necessity of time synchronization may be determined based on a specific timer. This timer is referred to as Time Alignment Timer (TAT). The TAT starts or restarts with the acquisition of the time synchronization. If the timer expires, the system determines that the time synchronization has been lost. Accordingly, the eNB 604 then transmits the TAC MAC CE to the UE 600 before the expiry of the timer so as to acquire time synchronization. The TAC MAC CE includes Timing Advance Command (TAC), and the UE 600 shifts the timing as much as the time duration indicated by the TAC.

Finally the eNB 605 transmits an extended TAC MAC CE to the UE 600 at step 685. As described above, because it is more efficient to transmit the TAC MAC CEs for multiple TAGs in one extended TAC MAC CE, exemplary embodiments of the present invention propose transmission of an extended TAC MAC CE. The extended TAC MAC CE can be implemented in various formats, and exemplary embodiments of the present invention propose several efficient extended TAC MAC CE formats.

Figure 7:
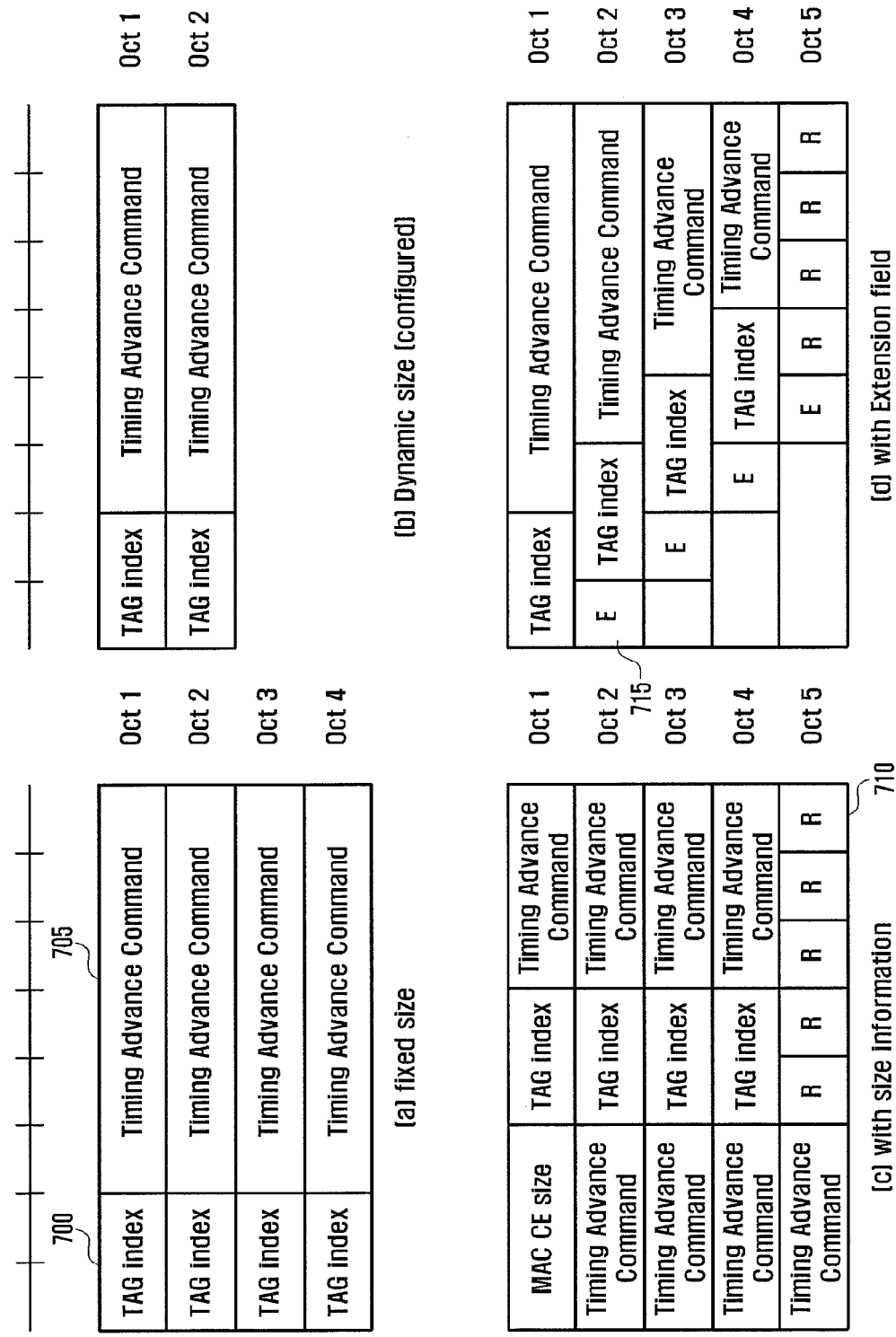
FIG. 7 is a diagram illustrating the formats of an extended Timing Advance Command (TAC) Medium Access Control (MAC) Control Element (CE) for use in a method according to an exemplary embodiment of the present invention.

FIG. 7 is a diagram illustrating the formats of an extended TAC MAC CE for use in a method according to an exemplary embodiment of the present invention.

Referring to FIG. 7, Part (a) of FIG. 7 shows a TAC MAC CE having a fixed size. The size of the TAC MAC CE is determined to accommodate the TACs of all TAGs. In order to indicate the TAG for which the TAC is transmitted, a TAG index 700 is inserted before the TAC 705. If the number of allowed TAGs is 4, two bits are required for the TAG index field to discriminate among all of the TAGs. In order to carry the total 4 TACs, the extended TAC MAC CE has a length of 4 bytes.

Part (b) of FIG. 7 shows a TAC MAC CE having variable size. If the TAC MAC CE has a variable size, the UE must be informed that the MAC CE has a variable length. The number of TAGs and information on the corresponding TAGs to be carried in the TAC MAC CE can be configured through a Radio Resource Control (RRC) message. For example, the TAC MAC CE can be included in the RRC Connection Reconfiguration message for adding/modifying/releasing SCells. The number of TAGs can be indicated in a MAC sub-header corresponding to the TAC MAC CE. Because the time synchronization operation is not always performed for all of the TAGs, it is possible to transmit to the UE only the TACs for the TAGs requiring time synchronization.

Part (c) of FIG. 7 shows a TAC MAC CE with information on the number of TAGs. This TAC MAC CE formation includes a size information field/number of included TAGs and reserved bits 710 for match by unit of byte according to the sizes of the TAG index fields influenced by the maximum allowed number of TAGs.

Part (4) of FIG. 7 shows a TAC MAC CE with extension bits for indicating the size of TAC MAC CEs. If a TAC for another TAG follows another TAC, this is indicated by an extension (E) bit 715. For example, if the E bit is set to 0, then such a setting may indicate that no more TAC information follows; and otherwise, if the E bit is set to 1, then such a setting may indicate that the TAC for another TAG follows.

Figure 8:
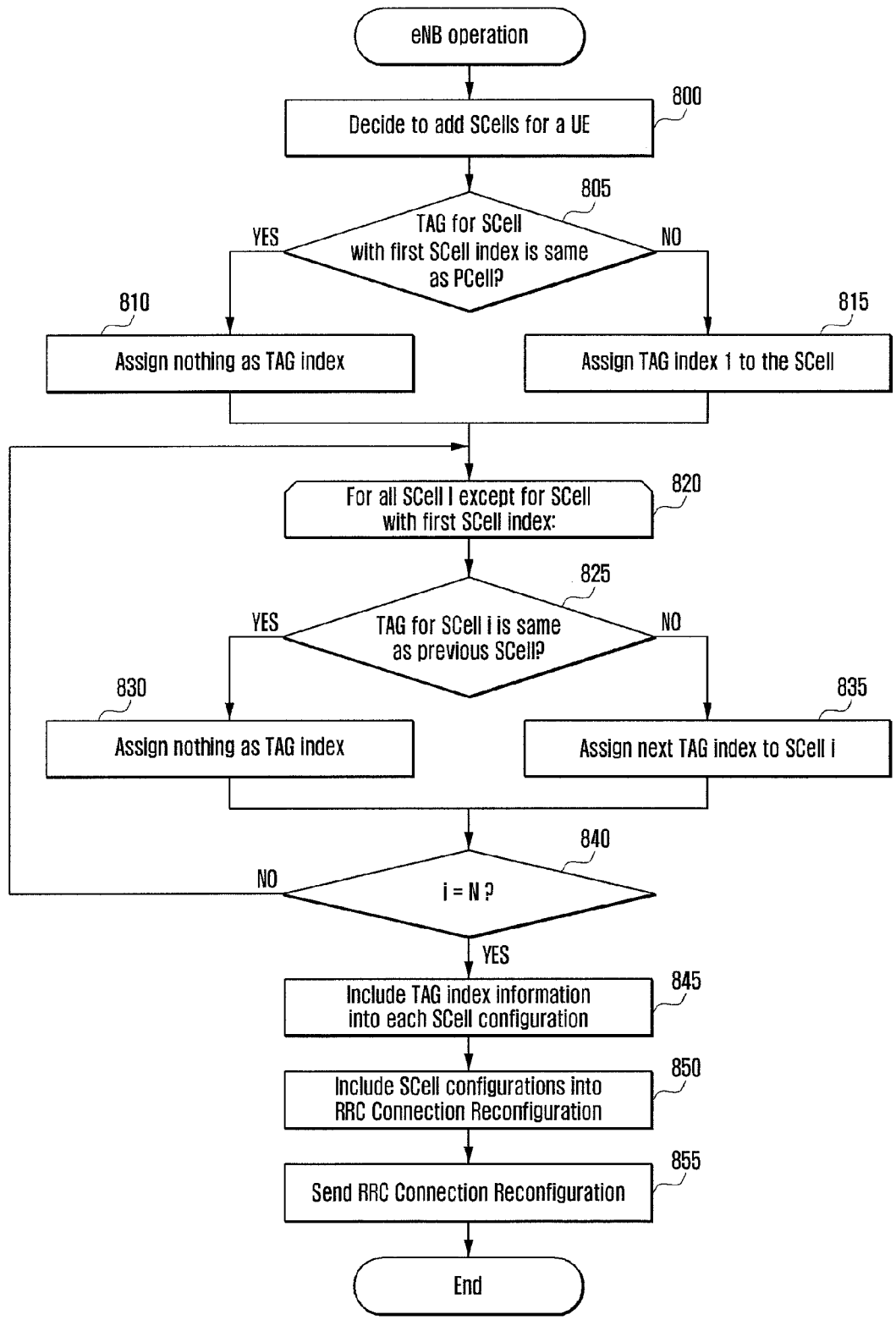
FIG. 8 is a flowchart illustrating an eNB procedure of a method according to an exemplary embodiment of the present invention

FIG. 8 is a flowchart illustrating an eNB procedure of a method according to an exemplary embodiment of the present invention.

The eNB decides to add SCells for a UE at step 800. Next, the eNB determines whether the SCell 1 belongs to the same TAG as the PCell at step 805. In other words, at step 805, the eNB determines whether the SCell 1 has the same uplink timing as the PCell. If it is determined that the SCell having the first SCell index belongs to the same TAG as the PCell at step 805, then the eNB adds no TAG index to the configuration information on the SCell at step 810. If it is determined that the SCell having the first SCell index does not belong to the same tag as the PCell at step 805, the eNB adds the next TAG index to the configuration information on the SCell 1.

Next, the eNB performs next process from the SCell having the second SCell index at step 820. The eNB determines whether the $i^{th}$ SCell belongs to the same TAG as the $(i-1)^{th}$ SCell at step 825. If it is determined that the $i^{th}$ SCell belongs to the same TAG as $(i-1)^{th}$ SCell at step 825, then the eNB skips adding a TAG index to the configuration information on the $i^{th}$ SCell at step 830. Otherwise, if it is determined that the $i^{th}$ SCell does not belong to the same TAG as $(i+1)^{th}$ SCell at step 825, then the eNB adds a new TAG index to the configuration information on the $i^{th}$ SCell at step 835.

The eNB determines whether the index assignment has been done for all of the SCells available for the UE at step 840 and, if so, the procedure goes to the next step. Otherwise, if there is any SCell remaining for which index assignment must be completed, the procedure returns step 820. Afterward, the eNB includes the TAG index information into each SCell configuration information at step 845. Next, the eNB includes the SCell configuration information into the RRC Connection Reconfiguration message at step 850 and transmits the RRC Connection Reconfiguration message to the UE at step 855.

Figure 9:
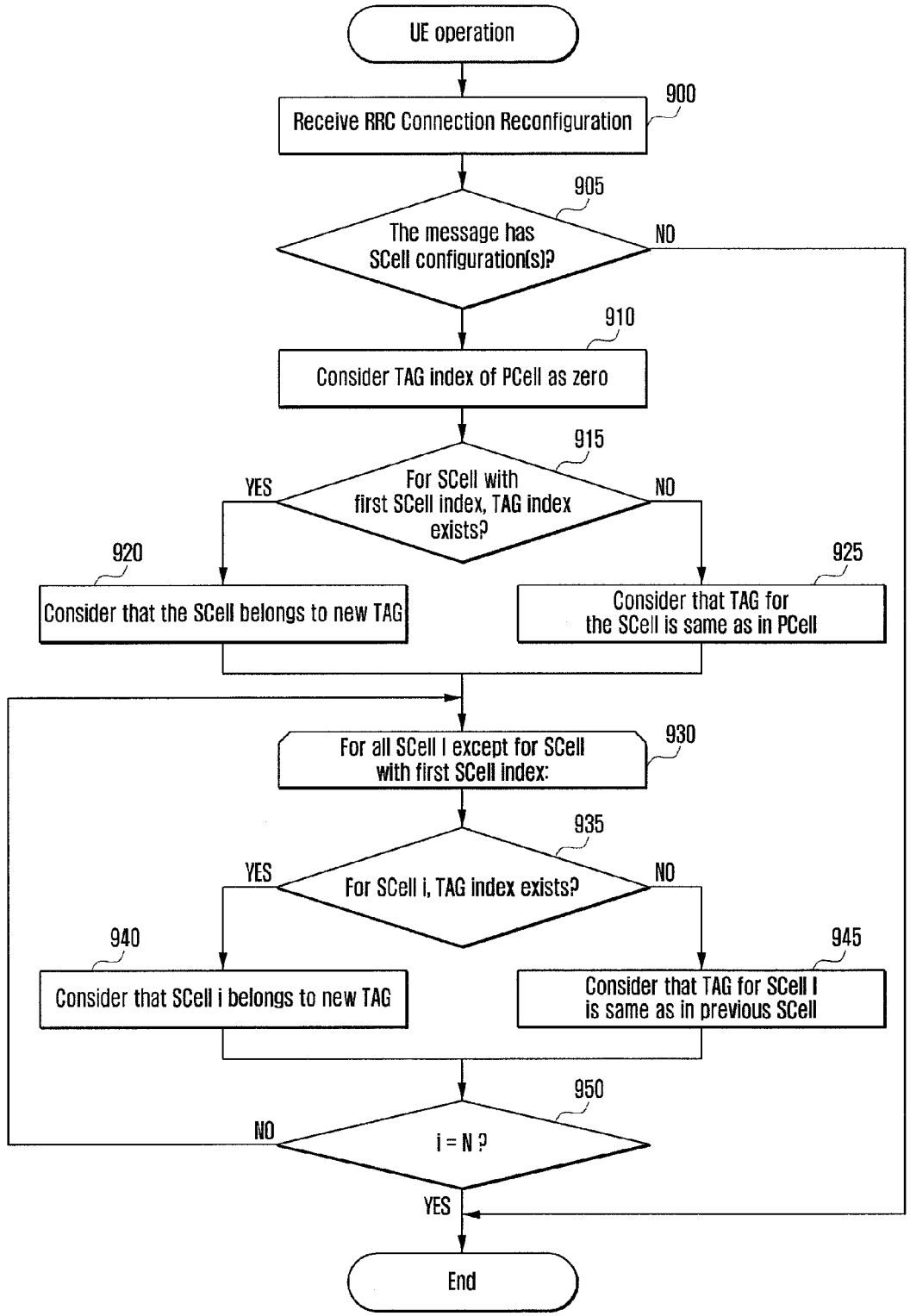
FIG. 9 is a flowchart illustrating a UE procedure of a method according to an embodiment of the present invention.

FIG. 9 is a flowchart illustrating a UE procedure of a method according to an exemplary embodiment of the present invention.

The UE receives the RRC Connection Reconfiguration message transmitted by an eNB at step 900.

Next, the UE determines whether the RRC Connection Reconfiguration message includes SCell configuration information at step 905. If no SCell configuration information is included, then the UE terminates the procedure. If the SCell configuration is included, then the UE sets the TAG index of the PCell to the highest value at step 910. That is, if the TAG index value starts from 0, the TAG index of the PCell is set to 0.

Afterward, the UE determines whether the configuration information on the SCell having the first SCell index includes a TAG index at step 915. If the TAG index is included at step 915, then the UE regards that the SCell as belonging to a new TAG different from the TAG to which the PCell belongs at step 920. Otherwise, if the TAG index is included at step 915, then the UE regards that the SCell as belonging to the same TAG as the PCell at step 925.

Next, the UE performs the next step operation for the SCell having the second SCell index at step 930 and then determines whether the configuration information of the $i^{th}$ SCell includes a TAG index at step 935. If the TAG index is included, then the UE regards that the $i^{th}$ SCell as belonging to a new TAG different from that of the $(i-1)^{th}$ SCell at step 940 such that the corresponding TAG is indicated by the included TAG index. Otherwise, if no TAG index is included, then the UE regards that the $i^{th}$ SCell as belonging to the same TAG as the $(i-1)^{th}$ SCell at step 945.

Finally, the UE determines whether this operation has been performed for all of the SCells allowed to the UE at step 950 and, if so, the UE terminates the procedure. Otherwise, the procedure goes to step 930.

Second Exemplary Embodiment

As described above, when transmitting to the UE the SCell configuration of each secondary carrier, the TAG indices of the secondary carriers are included in the corresponding configurations of all the secondary carriers. In contrast to other exemplary embodiments of the present invention, some exemplary embodiments may be such that there is no SCell configuration having no TAG index. According to such exemplary embodiments of the present invention, however, the TAG index of the PCell is not informed explicitly but rather set to the highest value. That is, if the TAG index starts from 0, then the TAG index of the PTAG to which the PCell (i.e. the primary carrier) belongs is set to 0. FIG. 6 illustrates examples of the contrasting exemplary embodiments of the present invention. For example, at steps 615 and 625 of FIG. 6, the TAG index denoted with '$2^{nd}$ embodiment' corresponds to an exemplary embodiment of the present invention in which the TAG index of the PCell is not informed explicitly.

Figure 10:
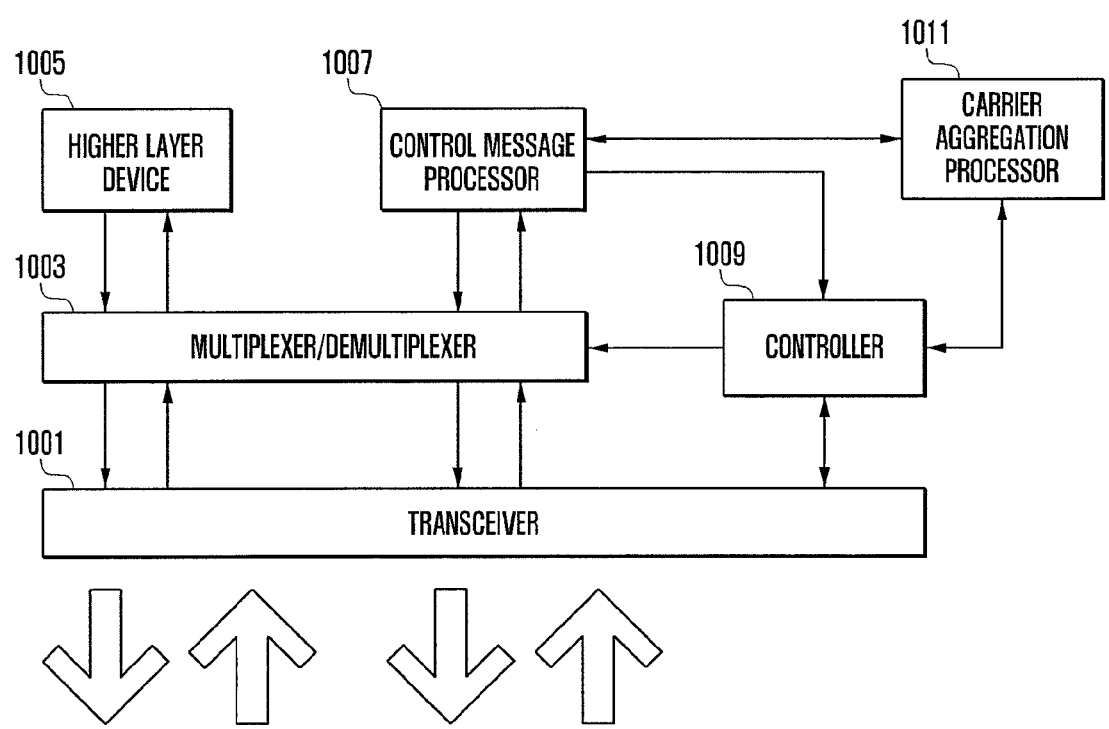
FIG. 10 is a block diagram illustrating a configuration of a UE according to an exemplary embodiment of the present invention.

FIG. 10 is a block diagram illustrating a configuration of a UE according to an exemplary embodiment of the present invention.

Referring to FIG. 10, the UE transmits/receives data generated by a higher layer device 1005 and control messages generated by a control message processor 1007. When transmitting control signal and/or data to the eNB, the UE multiplexes the control signal and/or data by means of the multiplexer/demultiplexer 1003 under the control of the controller 1009. When receiving control signal and/or data from the eNB, the UE receives the physical signal by means of the transceiver 1001, demultiplexes the received signal by means of the multiplexer/demultiplexer 1003, and delivers the demultiplexed signal to the corresponding higher layer device 1005 or control message processor 1007.

According to exemplary embodiments of the present invention, if a TAC MAC CE is received, the control message processor delivers the TAC MAC CE to the carrier aggregation processor 1011. The carrier aggregation processor 1011 commands the controller 1009 to apply the TAC for the corresponding TAG.

Figure 11:
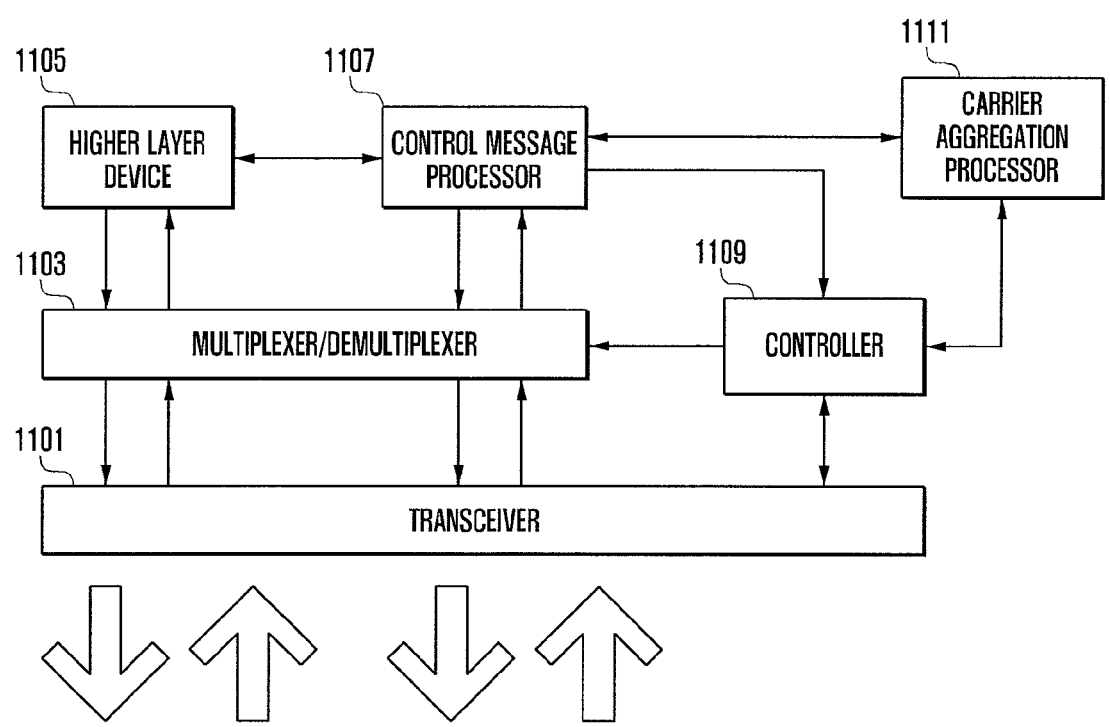
FIG. 11 is a block diagram illustrating a configuration of an eNB according to an exemplary embodiment of the present invention.

FIG. 11 is a block diagram illustrating a configuration of an eNB according to an exemplary embodiment of the present invention.

Referring to FIG. 11, the eNB transmits/receives data generated by a higher layer device 1105 and control messages generated by a control message generator 1107. In transmission mode, the data is multiplexed by the multiplexer/demultiplexer 1103 and then transmitted through the transceiver 1101 under the control of the controller 1109. In reception mode, the physical signal is received by the transceiver 1101, demultiplexed by the multiplexer/demultiplexer 1103, and then delivered to the higher layer device 1105 or the control message processor 1107 according to the message information under the control of the controller 1109.

According to exemplary embodiments of the present invention, the higher layer device 1105 determines whether to allow the UE to use the SCells. If the UE is allowed to use the SCells, the higher layer device 1105 analyzes the TAG to which each SCell belongs and sends the analysis result to the control message processor 1107. The control message processor 1107 includes the TAG index in SCell configuration information for a corresponding SCell, encapsulates all configuration information in the RRC Connection Reconfiguration message and sends the RRC Connection Reconfiguration message to the multiplexer/demultiplexer 1103. If it is necessary to perform the time synchronization for multiple TAGs, the carrier aggregation processor 1111 sends the TAC values of the respective TAGs to the control message processor 1107. The control message processor 1107 includes the TAC values of all the TAGs in the extended TAC MAC CE and sends the extended TAC MAC CE to the multiplexer/demultiplexer 1103.

As described above, the timing advance group management method and apparatus according to exemplary embodiments of the present invention is capable of informing of the timing advance group to which each carrier belongs and managing multiple timing advance groups efficiently without signaling overhead.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing at least one timing advance group (TAG) by a base station in a wireless communication system supporting carrier aggregation, the method comprising:
    mapping each of at least one cell to at least one TAG, the TAG including at least one cell corresponding to same uplink timing advance;
    identifying whether a cell to be configured is a part of a primary TAG (PTAG) including a primary cell (PCell);
    transmitting, to a terminal, control information including a TAG identifier of the cell, if the cell is not part of the PTAG; and
    transmitting, to the terminal, control information without a TAG identifier of the cell, if the cell is part of the PTAG,
    wherein a TAG of the cell is assigned to the terminal as the PTAG if the TAG identifier of the cell is not included in the control information, and
    wherein a TAG of the cell is assigned to the terminal as a secondary TAG (STAG) corresponding to the TAG identifier if the TAG identifier of the cell is included in the control information.

2. The method of claim 1, further comprising:
    transmitting, to the terminal, MAC control element (MAC CE) including a TAG identifier and timing advance command (TAC) for time alignment of a TAG associated with the TAG identifier.

3. The method of claim 2, wherein if the TAG identifier is 0, the TAC is for the PTAG.

4. The method of claim 2, wherein if the TAG identifier is not 0, the TAC is for the STAG which does not include the PCell.

5. The method of claim 1, further comprising:
    initiating a non-contention based random access procedure with a physical downlink control channel (PDCCH) order for time alignment for at least one STAG.

6. A method for managing at least one timing advance group (TAG) by a terminal in a wireless communication system supporting carrier aggregation, the method comprising:
    receiving first control information on configuring a first cell;
    receiving second control information on configuring a second cell, the second control information including a TAG identifier if the second cell is not part of a TAG of the first cell, the second control information not including a TAG identifier if the second cell is part of the TAG of the first cell;
    receiving MAC control element (MAC CE) including a TAG identifier and timing advance command (TAC) associated with at least one of the first cell and the second cell for time alignment of a TAG associated with the TAG identifier; and
    applying the TAC for the TAG associated with the TAG identifier,
    wherein the TAG of the first cell is a primary TAG (PTAG) including a primary cell (PCell),
    wherein a TAG of the cell is assigned to the terminal as the PTAG if the TAG identifier of the cell is not included in the control information, and
    wherein a TAG of the cell is assigned to the terminal as a secondary TAG (STAG) corresponding to the TAG identifier if the TAG identifier of the cell is included in the control information.

7. The method of claim 6,
    wherein if the TAG identifier is not 0, the TAC is for the STAG which does not include the PCell, and
    wherein if the TAG identifier is 0, the TAC is for the PTAG which includes the PCell.

8. The method of claim 6, wherein the TAG includes at least one cell corresponding to same uplink timing advance.

9. The method of claim 6, wherein the first cell is the PCell.

10. The method of claim 6, further comprising:
    receiving information for time alignment for at least one STAG using a non-contention based random access procedure with a physical downlink control channel (PDCCH) order.

11. A base station for managing at least one timing advance group (TAG) in a wireless communication system supporting carrier aggregation, the base station comprising:
    a transmitter configured to transmit data; and
    a controller configured to:
        map each of at least one cell to at least one TAG, the TAG including at least one cell corresponding to same uplink timing advance;
        identify whether a cell to be configured is part of a primary TAG (PTAG) including a primary cell (PCell);
        transmit, to a terminal, control information including a TAG identifier of the cell, if the cell is not part of the PTAG; and
        transmit, to the terminal, control information without a TAG identifier of the cell, if the cell is part of the PTAG,
    wherein a TAG of the cell is assigned to the terminal as the PTAG if the TAG identifier of the cell is not included in the control information, and
    wherein a TAG of the cell is assigned to the terminal as a secondary TAG (STAG) corresponding to the TAG identifier if the TAG identifier of the cell is included in the control information.

12. The base station of claim 11, wherein the controller is further configured to transmit, to the terminal, MAC control element (MAC CE) including a TAG identifier and timing advance command (TAC) for time alignment of a TAG associated with the TAG identifier.

13. The base station of claim 12, wherein if the TAG identifier is 0, the TAC is for the PTAG.

14. The base station of claim 12, wherein if the TAG identifier is not 0, the TAC is for the STAG which does not include the PCell.

15. The base station of claim 11, wherein the controller is further configured to initiate a non-contention based random access procedure with a physical downlink control channel (PDCCH) order for time alignment for at least one STAG.

16. A terminal for managing at least one timing advance group (TAG) in a wireless communication system supporting carrier aggregation, the terminal comprising:
   a receiver configured to receive data; and
   a controller configured to:
      receive first control information on configuring a first cell;
      receive second control information on configuring a second cell, the second control information including a TAG identifier if the second cell is not part of a TAG of the first cell, the second information not including a TAG identifier if the second cell is part of the TAG of the first cell;
      receive MAC control element (MAC CE) including a TAG identifier and timing advance command (TAC) associated with at least one of the first cell and the second cell for time alignment of a TAG associated with the TAG identifier; and
      apply the TAC for the TAG associated with the TAG identifier,
   wherein the TAG of the first cell is a primary TAG (PTAG) including a primary cell (PCell),
   wherein a TAG of the cell is assigned to the terminal as the PTAG if the TAG identifier of the cell is not included in the control information, and
   wherein a TAG of the cell is assigned to the terminal as a secondary TAG (STAG) corresponding to the TAG identifier if the TAG identifier of the cell is included in the control information.

17. The terminal of claim 16, wherein if the TAG identifier is not 0, the TAC is for the STAG which does not include the PCell.

18. The terminal of claim 16, wherein the TAG includes at least one cell corresponding to same uplink timing advance.

19. The terminal of claim 16, wherein the first cell is the PCell.

20. The terminal of claim 16, wherein the controller is further configured to receive information for time alignment for at least one STAG using a non-contention based random access procedure with a physical downlink control channel (PDCCH) order.

* * * * *